Patented Jan. 8, 1946

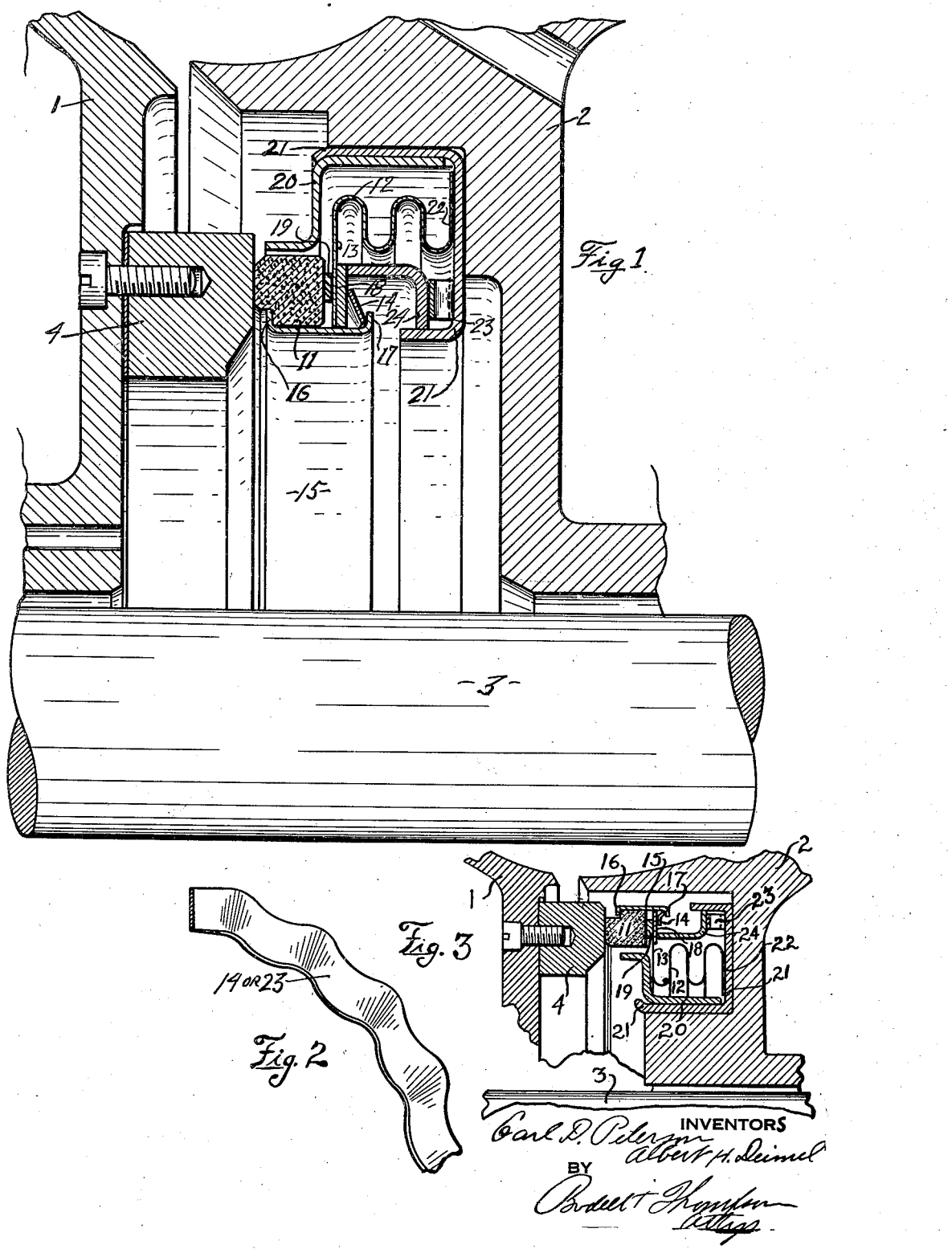

2,392,763

UNITED STATES PATENT OFFICE 2,392,763

FLUID SEAL

Carl D. Peterson and Albert H. Deimel, Toledo, Ohio

Application October 12, 1943, Serial No. 505,962

7 Claims. (Cl. 286—11)

This invention relates to fluid seals for preventing the escape of oil from such apparatus as hydraulic couplings, and other hydraulic apparatus including a pump or impeller and a driven member or runner and driven shaft coaxially with the pump or impeller and the runner. One of the difficulties in obtaining a satisfactory fluid seal between two rotating parts is due to the use of a material for one of the sealing means which has a different coefficient of expansion than other co-acting elements used, so that the usual bonding material, glues, etc., will not work for any length of time in bonding these materials together. One of the materials for the sealing element or ring is usually carbon, and the other, metal. Carbon does not expand or has a low coefficient of expansion. Its tensile strength is low, but its compression strength is high.

This invention has for its object a seal construction for forming an effective long-lived bond between two elements of the seal, which rotate together, but have different coefficients of expansion, as for instance between a carbon sealing ring and a metal backing therefor. The metal backing or flange or diaphragm and the carbon sealing ring have heretofore been ineffectively bonded together, and one of the objects of this invention is a simple bonding ring between the carbon sealing ring or its equivalent and the metal backing therefor.

It further has for its object a unit construction for the seal including the sealing ring, the bellows and the bonding ring, and spring means for thrusting the bonding ring axially against a sealing ring on the other of the two relatively rotating parts.

The invention consists in the novel features and in the combinations and constructions hereinafter set forth and claimed.

In describing this invention, reference is had to the accompanying drawing, in which like characters designate corresponding parts in all the views.

Figure 1 is a sectional view of this sealing unit and contiguous parts including the runner and impeller of a hydraulic coupling and the driven shaft thereof.

Figure 2 is a fragmentary view illustrative of either of two spring means, one of which is used in the unitary construction, and the other, to force the unitary structure axially.

Figure 3 is a diagrammatic view illustrating a slightly modified form of the seal.

1 and 2 designate, respectively, the impeller and runner of a hydraulic coupling of any suitable construction, and 3, the output shaft of the coupling. The impeller and runner constitute, in a general sense, two relatively rotating parts. 4 designates a metal sealing ring on one of said relatively rotating parts, as the part 1, the sealing means on the other of said relatively rotating parts, as the part 1, consisting of a unit and a housing for the unit, which housing with the unit therein may be readily applied to the member 1 to rotate therewith, with the unit shiftable axially of the housing under spring pressure. In fact, the sealing unit and the housing may be assembled and installed as a unit.

The unit consists of a sealing ring 11 of a material having a low coefficient of expansion, as carbon, a bellows 12 having an internal annular flange or head 13 at one end, opposed to one side of the ring 11 but spaced therefrom, bonding means between the carbon sealing ring 11 and the flange 13 for sealing these opposing surfaces against the passage of oil, a spring 14 within the bellows thrusting the flange 13 against the bonding means, and the bonding means against the sealing ring 11, and a retaining ring 15 for holding the parts 11, 12 and 14 assembled. The retaining means is here shown as a ring channel-shaped in cross section with its side flanges 16, 17 forming abutments for the sealing ring 11 and the spring 14. The spring 14 thrusts directly against a metal or steel washer 18 interposed between the inner face of the flange 13 and the spring 14.

The bonding means is a soft metal, as a lead washer 19 interposed between the outer face of the flange 13 and the opposing face of the sealing ring 11. This lead ring forms a bond and entirely cures the defect in fluid seals, due to the use of diaphragms which may be of rubber or synthetic material, or other materials, which is deteriorated by heat and/or oil. The spring 14 compensates for the difference in expansion of carbon and metal, it being understood that carbon has very little expansion.

The unit consisting of the sealing ring 11, bellows 13, spring 14, washer 18 and retaining ring 15 may be placed as a unit in the situation in which it is used, that is, in the housing, which is to be applied to one of the relatively rotating parts, and means is provided for thrusting this unit axially to keep the sealing ring 11 thrust under spring tension against the metallic sealing ring 4 with which it coacts. The housing consists of tubular or cup-shaped sections 20 and 21 telescoped and secured together, after the unit has been assembled therein. When assembled therein, an outwardly extending flange 22 at the end of the bellows remote from the inwardly extending flange 13 abuts against the bottom of the tubular cup-shaped section 21. The unit is thrust axially by means of the spring 23 interposed between the cup-shaped section 21 and a spacer 24, which thrusts against the washer 18. This spacer is angular in cross section. The spring 23 is here shown as a wave washer. The springs 23 and 14 are similar in construction, as illustrated in Figure 2. However, any suitable springs may be substituted therefor.

Owing to the unitary construction, the unit may be readily applied in an annular housing, which in turn may be applied to one of two rotating elements, and owing to the lead sealing ring 19, a permanent bond is maintained between the carbon sealing ring and the metallic backing or bellows therefor, and owing to the unitary construction, the entire unit may be spring-pressed to compensate for wear at the sealing face of the carbon sealing ring.

What we claim is:

1. A fluid seal for mounting in one of two relatively rotating elements and coacting to form a seal with means on the other of said elements, including a carbon sealing ring, bellows having an internal flange at one end opposed to one side of the sealing ring, a soft metal bonding ring between the flange of the bellows and the sealing ring, a spring for thrusting the flange of the bellows against the bonding ring and the bonding ring against the carbon sealing ring, and means for holding the sealing ring, bellows and spring assembled as a unit, the retaining means being in the form of a channel in cross section having its side flanges coacting with the carbon ring and the spring respectively, the retaining ring extending axially into the bellows into the interior thereof and the spring being located within the bellows.

2. A fluid seal for mounting in one of two relatively rotating elements and coacting to form a seal with means on the other of said elements, including a carbon sealing ring, bellows having an internal flange at one end opposed to one side of the sealing ring, a soft metal bonding ring between the flange of the bellows and the sealing ring, a spring for thrusting the flange of the bellows against the bonding ring and the bonding ring against the carbon sealing ring, and a retaining ring for holding the sealing ring, bellows, bonding ring, and spring assembled as a unit, in combination with a housing around the bellows having an end wall against which the end of the bellows remote from the sealing ring thrusts, and means located within the housing and within the bellows for thrusting the unit axially.

3. A fluid seal for mounting in one of two relatively rotating elements and coacting to form a seal with means on the other of said elements, including a carbon sealing ring, bellows having an internal flange at one end opposed to one side of the sealing ring, means for bonding the sealing ring and the flange of said bellows, a spring for thrusting said flange toward the bonding means, and means for holding the sealing ring, bellows and spring assembled as a unit, the last means being a ring channel shaped in cross section and extending axially into the bellows having its side flanges forming abutments for the sealing ring and the spring, and an annular housing around the unit and having an end wall forming an abutment for the end of the bellows remote from the sealing ring, and resilient means within the housing and thrusting against the said end wall and the unit to shift the unit axially.

4. A fluid seal for mounting in one of two relatively rotating elements and coacting to form a seal with means on the other of said elements, including a carbon sealing ring, bellows having a flange at one end opposed to one side of the sealing ring, a soft metal bonding ring between the flange of the bellows and the sealing ring, a spring for thrusting the flange of the bellows against the bonding ring and the bonding ring against the carbon sealing ring, and a retaining ring for holding the sealing ring, bellows, bonding ring, and spring assembled as a unit, in combination with an annular housing having an end wall against which the end of the bellows remote from the sealing ring thrusts, and means located within the housing for thrusting the unit axially.

5. A fluid seal for mounting in one of two relatively rotating elements and coacting to form a seal with means on the other of said elements, including a carbon sealing ring, bellows having a flange at one end opposed to one side of the sealing ring, a soft metal bonding ring between the flange of the bellows and the sealing ring, a spring for thrusting the flange of the bellows against the bonding ring and the bonding ring against the carbon sealing ring, and retaining means for holding the sealing ring, bellows and spring assembled as a unit, the retaining means being a ring in the form of a channel in cross section having its side flanges coacting with the carbon ring and the spring respectively, the retaining ring and the spring being located concentric with the bellows.

6. A fluid seal for mounting in one of two relatively rotating elements and coacting to form a seal with means on the other of said elements, including a carbon sealing ring, bellows having a flange at one end opposed to one side of the sealing ring, a soft metal bonding ring between the flange of the bellows and the sealing ring, a spring for thrusting the flange of the bellows against the bonding ring and the bonding ring against the carbon sealing ring, and retaining means for holding the sealing ring, bellows and spring assembled as a unit, the retaining means being a ring in the form of a channel in cross section having its side flanges coacting with the carbon ring and the spring respectively, the retaining ring and the spring being located concentric with the bellows and outside of the bellows.

7. A fluid seal for mounting in one of two relatively rotating elements and coacting to form a seal with means on the other of said elements, including a carbon sealing ring, bellows having a flange at one end opposed to one side of the sealing ring, means for bonding the sealing ring and the flange of said bellows, a spring for thrusting said flange toward the bonding means, and means for retaining the sealing ring, bellows and spring assembled as a unit, the retaining means being a ring channel shaped in cross section and extending concentric with the bellows and having its side flanges forming abutments for the sealing ring and the spring, and an annular housing for the unit and having an end wall forming an abutment for the end of the bellows remote from the sealing ring, and resilient means within the housing and thrusting against the said end wall and the unit to shift the unit axially.

CARL D. PETERSON.
ALBERT H. DEIMEL.